United States Patent [19]
Tamaki et al.

[11] 3,906,079
[45] Sept. 16, 1975

[54] METHOD FOR DESULFURIZING A WASTE GAS

[75] Inventors: Kiheiji Tamaki; Yoshiaki Miura; Akira Okamoto; Masaaki Nakamura, all of Kitakyushu, Japan

[73] Assignee: Nippon Steel Corporation, Tokyo, Japan

[22] Filed: July 11, 1973

[21] Appl. No.: 378,313

[30] Foreign Application Priority Data
July 18, 1972 Japan............................. 47-71865

[52] U.S. Cl. .............................................. 423/242
[51] Int. Cl.² ........................................... C01B 17/00
[58] Field of Search ........................ 423/242–243, 423/244

[56] References Cited
UNITED STATES PATENTS
3,547,583  12/1970  Wilson ............................... 423/242
3,720,754  3/1973   Wilson ............................... 423/244
3,809,745  5/1974   Wilson ............................... 423/244

Primary Examiner—Oscar R. Vertiz
Assistant Examiner—Gregory A. Heller
Attorney, Agent, or Firm—Watson Leavenworth Kelton & Taggart

[57] ABSTRACT

A mineral containing a mineral of Ca system and a material which oxidizes $SO_2$, for example, a substantially worthless slag obtained in the manufacture of iron or steel, is utilized as an absorbing agent for sulfur oxides in waste gas. A slurry having said absorbing agent suspended in water is brought into contact with the waste gas. The sulfur oxides are absorbed and removed from said waste gas so as to prevent air pollution, and at the same time, a gypsum of high purity can be recovered from the exhaust liquor after reaction.

8 Claims, 2 Drawing Figures

METHOD FOR DESULFURIZING A WASTE GAS

BACKGROUND OF THE INVENTION

In chemical factories, especially iron or steel-manufacturing plants, a great deal of waste gas containing $SO_2$ is emitted in the iron or steel manufacturing process, which will give rise to air pollution. Thus the desulfurization of the waste gas has become a very serious problem. The desulfurization method which has most commonly been practised is to absorb and remove $SO_2$ from the waste gas by the use of slaked lime or limestone as the absorber.

In such a method, the desulfurization of the waste gas is accomplished according to the following reactions in the alkaline or neutral absorbing tower.

$$CaCO_3 + SO_2 \rightarrow CaSO_3 + CO_2 \quad (1)$$
$$Ca(OH)_2 + SI_2 \rightarrow CaSO_3 + H_2O \quad (2)$$

The $CaSO_3$ thus emitted is recovered in the form of $CaSO_3 \cdot \frac{1}{2} H_2O$.

It is water-insoluble but emits $SO_2$ when contacted with acid. Thus it is not suitable for prevention of air pollution. In addition, it can not be sold in the market even if it is recovered in a large amount. Accordingly, it is made acidic by effecting pH adjustment according to the reaction (3) below, then pressurized in the oxidizing tower and subjected to an oxidizing reaction according to the reaction (4) below, whereby the gypsum $CaSO_4$ is produced which is waterinsoluble, stable at acidic solution and salable in the market at high prices. The $SO_2$ which is produced by oxidation at this time is returned to the original gas.

$$CaSO_3 + SO_2 + H_2O \rightarrow Ca(HSO_3)_2,$$
$$\text{or } CaSO_3 + H_2SO_4 \rightarrow Ca(HSO_3)_2 + CaSO_4 \quad (3)$$
$$Ca(HSO_3)_2 + \frac{1}{2}O_2 \rightarrow CaSO_4 + SO_2 + H_2O \quad (4)$$

Consequently, the conventional desulfurization treatment of the waste gas necessitates the steps of not only the reactions of (1) or (2) but also the reactions of (3) or (4), which requires a pH adjustment and an oxidizing tower in addition to the $SO_2$ absorbing tower. It has thus a disadvantage that the overall apparatus is enormously increased and the operation becomes extremely complicated.

It is therefore an object of the invention to overcome the aforesaid disadvantages which have been encountered in the prior art.

SUMMARY OF THE INVENTION

This invention relates to a method for desulfurizing a waste gas wherein a mineral containing (a) a mineral of Ca system and (b) a material which oxidizes $SO_2$, for example, a slag which occurs in the iron foundry is utilized in the form of a suspension in water; a desulfurization reaction is effected by gasliquid contact of the waste gas and the slurry of the absorbing agent; the waste gas is allowed to pass at first through the acidic region of the reaction vessel and then sequentially through the neutral region or the alkaline region of said vessel; the desulfurization reaction of the waste gas and the reaction for producing gypsum are allowed to take place simultaneously in said acidic region and then the sulfur oxide remaining in the waste gas is absorbed in said neutral or alkaline region for supplementing the desulfurization reactor.

This invention is based upon the finding that a mineral containing a mineral of Ca system and a material which oxidizes $SO_2$, for example, a slag generated in the iron foundry, has excellent properties as an agent for absorbing and removing $SO_2$ from the waste gas, and it can be accomplished by simultaneously effecting the desulfurization of the waste gas and the reaction for producing gypsum in the acidic region of the reaction vessel according to the gas-liquid contact system of the suspension of the absorbing agent in water and the waste gas, and sequentially effecting a desulfurization reaction of the sulfur remaining in the waste gas in the neutral or alkaline region.

The slag is produced in the iron foundry in the iron or steel manufacturing process, which is so cheap that it may be considered substantially as worthless and thus nothing as compared to the value of limestone or slaked lime. Thus, if the slag can be substituted for the limestone, the economical advantage accruing therefrom must be enormous. In addition, this invention necessitates only the absorbing tower as the reaction vessel, wherein the reaction for absorbing $SO_2$, the pH-adjustment reaction for producing $Ca(HSO_3)_2$ as well as the reaction for producing gypsum or $CaSO_4$ can be conducted simultaneously, and yet there is no need of the pH-adjustment apparatus or the oxidizing tower and, of course, no need of the operation thereof. It is a further economical advantage of this invention in view of a great curtailment of the apparatus and its operation.

The principle of this invention is described with reference to the results of the experiments.

1. Experimental unit.
   Venturi scrubber.

| Number of Steps: | One step |
|---|---|
| Capacity: | 1500 Nm³/H |
| Flow ratio: | Slurry 4 l/Waste das. Nm³O |
| Pressure loss: | 200mm $H_2O$ |
| Waste gas: | from Sintering machine ($SO_2$ Concentration = 1000 ppm) |

2. Absorbing agent.
   a. Slag (Blast furnace Slag; LD Converter Slag)
   b. Slaked lime
3. Result of experiment.

The LD converter slag, the blast furnace slag and the slaked lime are used as the absorbing agent, respectively. The relation between the change of the pH of the absorbing liquid and the change of the desulfurization rate is graphically shown in FIG. 1 (a), (b) and (c). Also, the relation between the change of the pH of the absorbing liquid and the change of the $SO_3$ and $SO_4$ content in the solid slurry after reaction is graphically shown in FIG. (d), (e) and (f). These results were obtained by experiments of the batch type.

The analysis of the above experimental results shows the findings as follows:

In case of using the conventional slaked lime as the absorbing agent, the desulfurization reaction is effected in the neutral or alkaline regions but not in the acidic region wherein the pH is not more than 5 as shown in FIG. 1 (c). As for the content of $CaSO_3$ and $CaSO_4$ in the solid value of the slurry after reaction, there is a small amount of $CaSO_4$ and a predominant amount of $CaSO_3$. It is thus understood that in the absorbing vessel having the slaked lime as an absorbing agent, there is a major part of $CaSO_3$ present while little $CaSO_4$ is produced and that it is necessary to produce CaSO₄ by oxidizing CaSO₃ by providing a pH adjustment apparatus and an oxidizing tower.

On the other hand, in case of using the LD converter slag and the blast furnace slag as the absorbing agent, the desulfurization reaction is effected vigorously even in the acidic region of pH 1 to 3 as shown in FIG. 1 (a) and (b). Although it lowers once in the acidic region of pH 4 to 5, it becomes as vigorous again as in the case of the slaked lime in the neutral or alkaline region having the pH over 5. As for the content of CaSO₃ and CaSO₄ in the solid value of the slurry after reaction, the result is contrary to that in case of the slaked lime. That is, there is little CaSO₃ while a predominant amount of CaSO₄ is present. Particularly in the acidic region having the pH of not more than 4, there is substantially no CaSO₃ present while a gypsum of high purity is present. According to this new finding, it is possible in this invention to omit the provision and operation of the pH adjustment apparatus and the oxidizing tower and to only provide and operate the absorbing vessel.

reactions chemical reaction in the absorbing vessel are presumed to proceed as hereinafter described. However, the slag is essentially a material of very complicated structure and it is very difficult to accurately determine the chemical reactions for catalytically utilizing the slag. Therefore, this invention should not be limited thereby.

The slag in the slurry contains 30 to 50% CaO, which reacts with water to produce Ca(OH)₂.

$$CaO + H_2O \rightarrow Ca(OH)_2 \quad (1)$$

The Ca(OH)₂ thus produced tends to react with SO₂ to produce CaSO₃.

$$Ca(OH)_2 + SO_2 \rightarrow CaSO_3 + H_2O \quad (2)$$

The CaSO₃ thus produced is subjected to the action similar to that of the pH adjustment apparatus in the acidic region of the absorbing liquid to produce Ca(HSO₃)₂.

$$CaSO_3 + SO_2 + H_2O \rightarrow Ca(HSO_3)_2 \quad (3)$$

In the acidic region of the absorbing liquid, the components such as Al₂O₃, SiO₂, Fe₂O₃, MnO etc. contained in the slag act catalytically to oxidize Ca(HSO₃)₂ to the gypsum CaSO₄ or to oxidize SO₂ to the sulfuric acid H₂SO₄.

$$Ca(HSO_3)_2 + O_2 \xrightarrow{(catalyst)} CaSO_4 + H_2SO_4 \quad (4)$$

Since the slag in the slurry contains CaO, it functions as Ca(OH)₂. Also it contains Al₂O₃ or other various components which act catalytically and thereby oxidize Ca(HSO₃)₂. To summarize, it is to be understood that the absorbing vessel of this invention having the slag in the slurry as an absorbing agent concurrently acts the roles of the conventional absorbing vessel, pH adjustment apparatus and oxidizing tower having the Ca(OH)₂ as an absorbing agent.

DESCRIPTION OF THE PREFERRED EMBODIMENT

Figure 2:
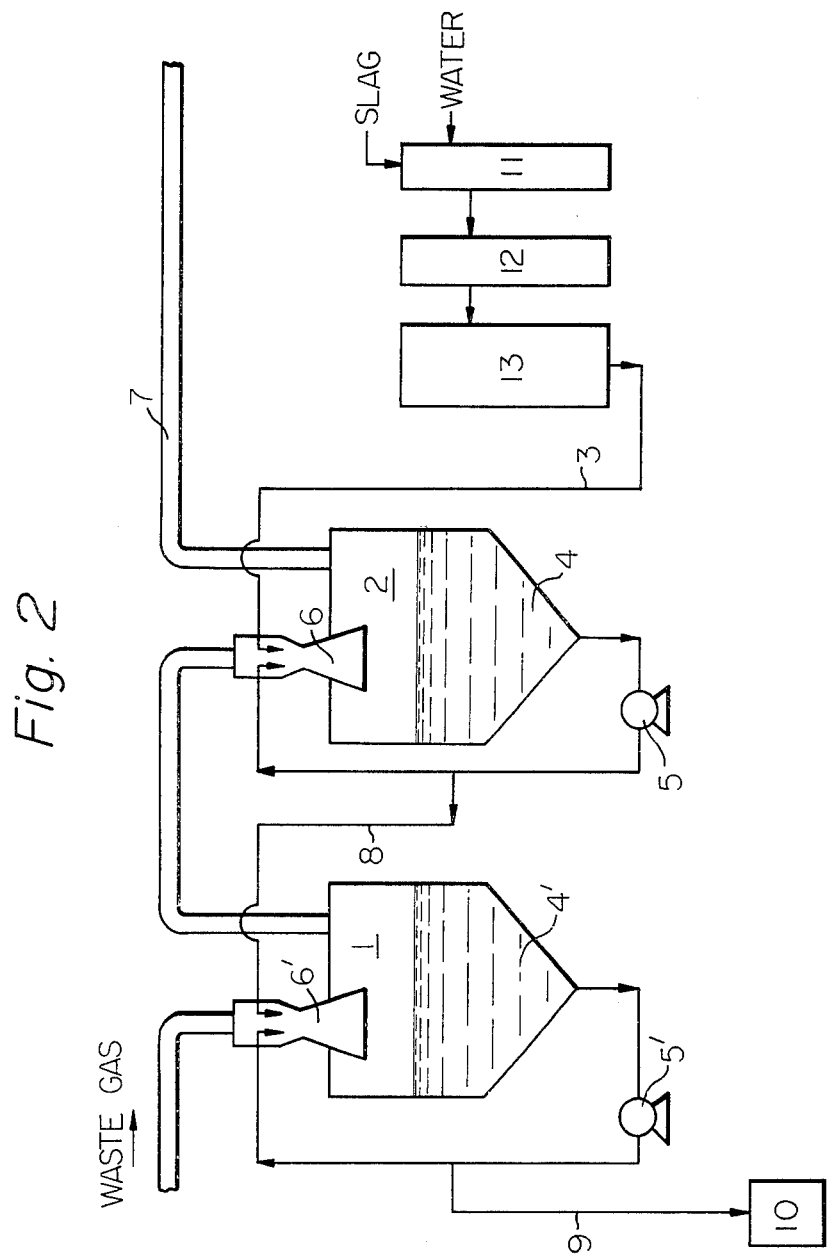
FIG. 2 is a flow sheet illustrating one embodiment of this invention.

One preferred embodiment of this invention is described with reference to FIG. 2.
1. The absorbing vessel used:
   Venturi scrubbers arranged in series.
   The volume of the gas passed: 1000 Nm³/H.
   The flow rate of the gas passed: 20 m/sec.
   The flow ratio of the gas and liquid:
   Slurry 8 l/Waste gas Nm³.
2. The SO₂ absorbing agent used:
   The aqueous slurry containing 6% LD converter slag which has been crushed by the wet-type crusher 11 and from which a part of the iron value such, for example, as metallic iron, iron oxides, etc. has been removed by the iron separator 12.
3. The waste gas used:
   The waste gas from a sintering machine.
   SO₂ concentration: average 500 ppm
   Temperature of the waste gas: 100°C
   Main components of the waste gas:
   CO₂ 7%, O₂ 12%, H₂O 10%
   Remarks: In this example, the Venturi scrubbers are arranged on the right and the left sides but they can be arranged vertically or stepwise.
4. Operation:
   The waste gas is passed to the upper part of the first absorbing vessel 1 of the Venturi scrubbers, and then to the second absorbing vessel 2 and discharged through the exhaust pipe 7 to the air.

The new slurry is passed from the stock slurry station 13 via the line 3 to the upper part of the second absorbing vessel 2 of the Venturi scrubbers through the Venturi 6. The slurry collected inside the vessel 4 is repeatedly recycled together with the new slurry via the pump 5 to the Venturi 6.

The increment of new slurry enters the first absorbing vessel 1 via the pipe 8 through the Venturi 6' of said vessel 1. The slurry collected inside said vessel 4' is repeatedly recycled via the pump 5' to the Venturi 6'. The increment of the slurry sent from the absorbing vessel 2 is by-passed via the pipe 9 and collected in the tank 10.

The new slurry is strongly alkaline since the converter slag contains about 40% CaO. However, while it is repeatedly passed through the absorbing vessel 2, it absorbs the SO₂ remaining in the waste gas sent from the absorbing vessel 1, whereby it is neutralized to a weak alkali of about pH 7 to 8. Accordingly, the absorbing vessel 2 has the weakly alkaline absorbing liquid and is operated while being continuously supplied with the fresh strongly alkaline slurry. Thus, the SO₂ remaining in the waste gas coming from the absorbing vessel 1 is absorbed in the slurry substantially completely and the substantially clear gas is discharged in the air. This can be explained below with reference to the principle of the invention.

Figure 1:
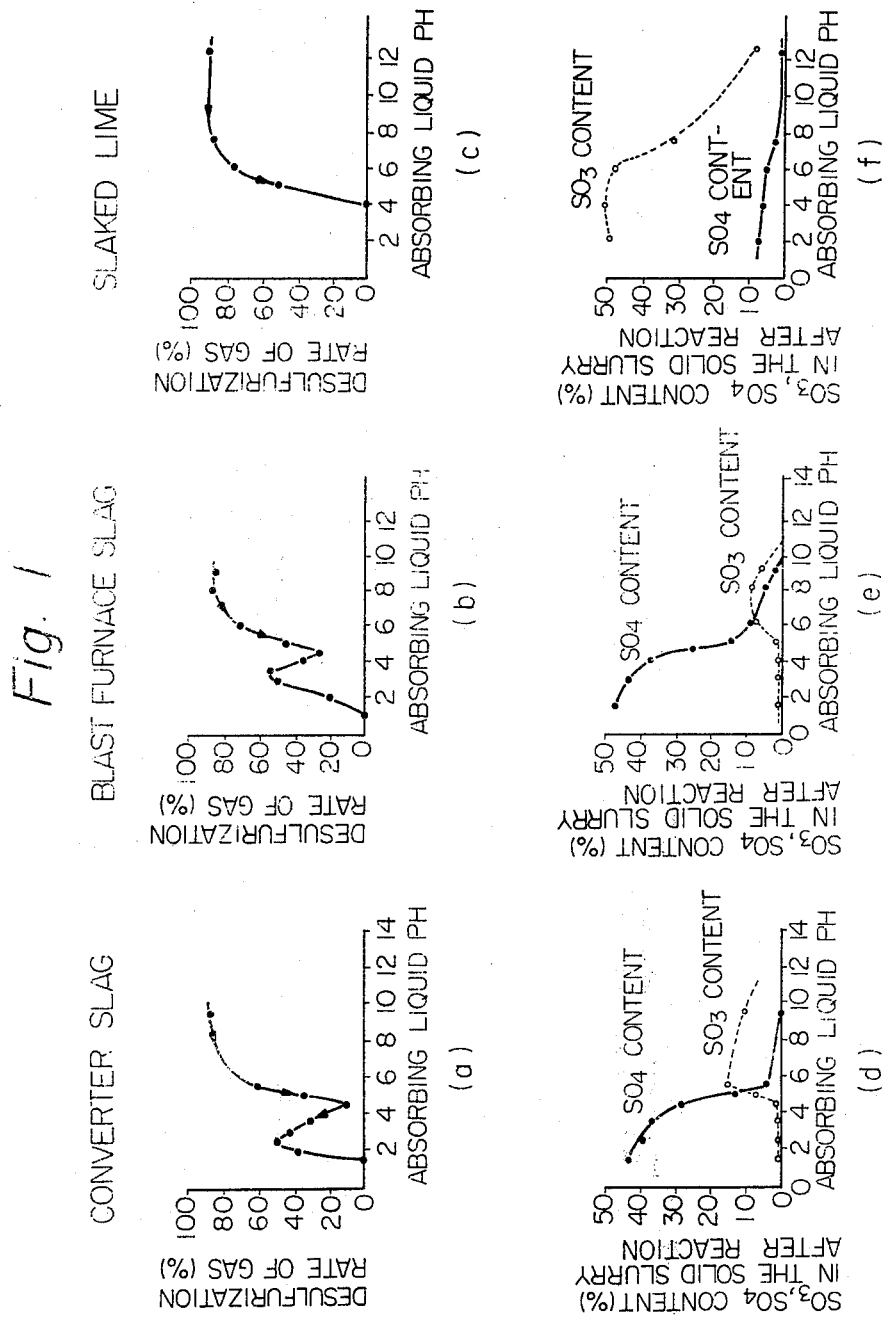
FIG. 1 (a), (b), (c), (d), (e) and (f) is a graph showing the principle of the invention.

The absorbing vessel 2 effects the reactions 1) and 2). The absorbing vessel 1 is supplied with the slurry of the converter slag which has been neutralized to pH 7 to 8 by absorbing a considerable amount of $SO_2$ from the absorbing vessel 1 and is operated by repeated recycle of that step. Since the waste gas supplied is fresh and the $SO_2$ concentration is as dense as about 500 ppm, it absorbs a greater part of the $SO_2$, becomes more acidic and is thus operated with the acidic solution of pH 2 to 3. For this reason, in the absorbing vessel 1, the oxidizing reactions 3). and 4) take place and as shown in FIG. 1 (e), there is little $CaSO_3$ present in the slurry while a predominant amount of $CaSO_4$ is present therein which also causes production of $H_2SO_4$.

Consequently, the by-product recovered from the exhaust solution collected via the pipe 9 was almost a pure gypsum $CaSO_4$.

5. Result of the operation:

The result of the operation in this embodiment of the invention is as follows: $SO_2$ concentration in the waste gas.

Inlet of the absorbing vessel 1:
Average 500 ppm
Inlet of the absorbing vessel 2:
Average 200 ppm
Discharged gas: 24 ppm
Desulfurization rate: 95.2%

$$(\frac{500-24}{500} \times 100)$$

The purity of the gypsum recovered:

Total sulfur: 14.8%
Sulfur as $SO_4$: 14.7%
Gypsum ratio: 99.3%

$$\left(\frac{\text{Sulfur as gypsum}}{\text{Total sulfur}} \times 100\right)$$

In the above embodiment, two Venturi scrubbers are used as the gas-liquid contact unit. However, a multiple-step unit of one continuous vessel type may be used with the similar result.

It is also known that if a wet type crusher is used for preparing the aqueous slurry and a part of the iron value is removed therefrom as in the above embodiment, the purity of the gypsum recovered is promoted while the wear of the unit and material can be lessened remarkably.

We claim:

1. A method for desulfurizing a waste gas containing $SO_2$ gas which comprises passing said waste gas into the acidic region of a first absorbing vessel containing an aqueous slurry of slag having CaO, $Al_2O_3$, $SiO_2$, $Fe_2O_3$ and $M_nO$, wherein the waste gas is simultaneously partially desulfurized and gypsum is produced, thereafter passing the partially desulfurized waste gas into the neutral to alkaline region of a second absorbing vessel containing partially spent slurry, wherein the remaining $SO_2$ present in the waste gas is removed therefrom, supplying a fresh aqueous slurry of slag to the second absorbing vessel while the partially desulfurized waste gas is being passed therethrough, discharging the partially spent slurry of slag contained in the second absorbing vessel at the same rate as fresh aqueous slurry is supplied to the second absorbing vessel, and withdrawing the desulfurized waste gas from the second absorbing vessel.

2. The method of claim 1 in which said slag is blast furnace slag.

3. The method of claim 1 in which said slag is LD converter slag.

4. The method of claim 1 in which the slag is subjected to crushing in a wet-type crusher to remove from said slag a portion of the iron content thereof, and provide an aqueous slurry of the slag.

5. A method for desulfurizing a waste gas containing $SO_2$ gas by passing the waste gas through the acidic region of a first absorbing vessel containing an aqueous slurry of slag having CaO, $Al_2O_3$, $SiO_2$, $Fe_2O_3$ and $M_nO$ to effect the partial desulfurization of the waste gas, which comprises introducing a fresh aqueous slurry of slag into the neutral to alkaline region of a second absorbing vessel causing the desulfurization of the remaining $SO_2$ present in the waste gas which had been previously partially desulfurized in the acidic region of the first absorbing vessel, thereafter passing said aqueous slurry of slag from the second absorbing vessel into the acidic region of the first absorbing vessel to simultaneously desulfurize the incoming waste gas and produce gypsum, and discharging the aqueous slurry of slag contained in the first absorbing vessel at the same rate as fresh aqueous slurry is added to the second absorbing vessel.

6. The method of claim 5 in which said slag is blast furnace slag.

7. The method of claim 5 in which said slag is LD converter slag.

8. The method of claim 5 in which the slag is subjected to crushing in a wet-type crusher to remove from said slag a portion of the iron content thereof, and provide an aqueous slurry of the slag.

* * * * *